(12) United States Patent
Ahn et al.

(10) Patent No.: US 8,386,944 B2
(45) Date of Patent: Feb. 26, 2013

(54) METHOD FOR PROVIDING GRAPHICAL USER INTERFACE AND ELECTRONIC DEVICE USING THE SAME

(75) Inventors: Jun-mo Ahn, Seoul (KR); Yong-hwan Kwon, Seongnam-si (KR); Joon-hwan Kim, Yongin-si (KR); Heui-jin Kwon, Seongnam-si (KR); Chang-soo Lee, Seoul (KR); Jeong-yeon Lee, Seongnam-si (KR); Victor Szilagyi, London (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 605 days.

(21) Appl. No.: 12/621,067

(22) Filed: Nov. 18, 2009

(65) Prior Publication Data

US 2010/0153872 A1 Jun. 17, 2010

(30) Foreign Application Priority Data

Dec. 11, 2008 (KR) ........................ 10-2008-0125905

(51) Int. Cl.
*G06F 15/00* (2006.01)
*G06F 13/00* (2006.01)

(52) U.S. Cl. ........................................ 715/764; 715/762
(58) Field of Classification Search .................. 715/716, 715/723, 731, 753, 830, 762–764, 840–841, 715/754–755
See application file for complete search history.

(56) References Cited

U.S. PATENT DOCUMENTS

| | | | |
|---|---|---|---|
| 2007/0070066 A1* | 3/2007 | Bakhash | 345/419 |
| 2009/0073132 A1* | 3/2009 | Lee et al. | 345/173 |
| 2009/0199119 A1* | 8/2009 | Park et al. | 715/765 |
| 2010/0281376 A1* | 11/2010 | Meaney et al. | 715/723 |

* cited by examiner

*Primary Examiner* — Cao "Kevin" Nguyen
(74) *Attorney, Agent, or Firm* — Sughrue Mion, PLLC

(57) ABSTRACT

A method for providing a graphical user interface (GUI) and an electronic device using the method are provided. The method includes forming one or more groups of GUI items other than a GUI item selected by a user, moving the GUI items in the one or more groups, and enlarging and displaying the selected item on an area formed by movement of the GUI items. Therefore, it is possible to provide a GUI which enables easy manipulation and which is displayed with superior visual effect on a screen that is relatively small in size.

24 Claims, 12 Drawing Sheets

METHOD FOR PROVIDING GRAPHICAL USER INTERFACE AND ELECTRONIC DEVICE USING THE SAME

CROSS-REFERENCE TO RELATED APPLICATIONS

This application claims priority from Korean Patent Application No. 10-2008-0125905, filed on Dec. 11, 2008, in the Korean Intellectual Property Office, the disclosure of which is incorporated herein by reference in its entirety.

BACKGROUND OF THE INVENTION

1. Field of the Invention

Apparatuses and methods consistent with the present invention relate to providing a graphical user interface (GUI), and more particularly, to providing a GUI comprising a plurality of GUI items which are capable of being selected by a user.

2. Description of the Related Art

Recently, the range of functions of electronic devices has increased, which has enabled the implementation of multimedia devices with remarkably developed digital technologies.

Because electronic devices have many functions, methods for using electronic devices are diverse and complicated. Additionally, a large number of items are provided through screens for users due to having so many functions.

However, since portable or remote control electronic devices have small screens, it is important to more efficiently provide diverse and complicated items. In addition, there is a need for graphical user interfaces (GUIs) which can be easily manipulated by a user and which have excellent visual effects.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Exemplary embodiments of the present invention provide a method for providing a graphical user interface (GUI) and an electronic device applying the method which moves GUI items, which are not selected by a user, to a predetermined area of a screen and which enlarges and displays a GUI item selected by the user on an area formed by movement of the non-selected GUI items, in order to provide the user with a GUI which enables easy manipulation and which is displayed with superior visual effect on a screen that is relatively small in size.

According to an aspect of the present invention, there is provided a method for providing a graphical user interface (GUI) comprising a plurality of GUI items, the method comprising a first operation for moving GUI items in a first group among GUI items other than a GUI item selected by a user, to a first area of a screen; a second operation for moving GUI items in a second group among the GUI items other than the selected GUI item, to a second area of the screen; and enlarging and displaying the selected GUI item on a third area of the screen formed by the first and second operations.

The GUI items in the first group may be displayed with a depth higher than the selected GUI item, and the GUI items in the second group may be displayed with a depth lower than the selected GUI item.

The first operation may comprise moving the GUI items in the first group to the first area while increasing the transparency of the GUI items in the first group.

The first operation may comprise moving the GUI items in the first group to the first area so that one of the GUI items in the first group partially disappears from the screen.

The method may further comprise displaying either 1) a plurality of sub-items contained in the selected GUI item or 2) a window formed as a result of activating the selected GUI item, after the selected GUI item disappears from the screen.

The first area may be an area containing a first corner of the screen, the second area may be an area containing a second corner of the screen, the first operation may comprise moving the GUI items in the first group to the first corner, and the second operation may comprise moving the GUI items in the second group to the second corner.

The first area may be an area containing a first corner of the screen, the second area may be an area containing a second corner of the screen, the first corner and the second corner may be symmetrical about the center of the screen. The first operation may comprise moving the GUI items in the first group from the second corner to the first corner, and the second operation may comprise moving the GUI items in the second group from the first corner to the second corner.

The first operation may comprise moving the GUI items in the first group to the first area while increasing or reducing the size of the GUI items in the first group, and the second operation may comprise moving the GUI items in the second group to the second area while increasing or reducing the size of the GUI items in the second group.

The first area may be an area containing a first corner of the screen, the second area may be an area containing a second corner of the screen, the GUI items in the first group may be placed closer to the first corner than the second corner, and the GUI items in the second group may be placed closer to the second corner than the first corner.

The first area may be an area containing a first corner of the screen, the second area may be an area containing a second corner of the screen, and the third area may be an area other than the first corner and second corner.

The first corner and the second corner may be symmetrical about the center of the screen.

Overlapping areas between the GUI items in the first group may be increased in size while the GUI items in the first group move to the first area, and overlapping areas between the GUI items in the second group may be increased in size while the GUI items in the second group move to the second area.

The GUI items in the first group may overlap one another while moving to the first area, and the GUI items in the second group may overlap one another while moving to the second area.

The enlarging and displaying may comprise enlarging the selected GUI item while moving the selected GUI item.

The plurality of GUI items may comprise a menu, an icon, a folder and contents, and the contents may comprise a moving image, a still image, music and text.

According to another aspect of the present invention, there is provided an electronic device comprising a graphical user interface (GUI) generator which generates a GUI comprising a plurality of GUI items which a user is able to select; and a controller which controls the GUI generator, so that GUI items in a first group among GUI items other than a GUI item selected by the user move to a first area of a screen, GUI items in a second group among the GUI items other than the selected GUI item move to a second area of the screen, and the selected GUI item is enlarged and displayed on a third area of the screen formed by movement of the GUI items in the first group and GUI items in the second group.

The GUI items in the first group may be displayed with a depth higher than the selected GUI item, and the GUI items in the second group may be displayed with a depth lower than the selected GUI item.

The controller may control the GUI generator so that the GUI items in the first group may move to the first area while the transparency of the GUI items in the first group is increased.

According to another aspect of the present invention, there is provided a method for providing a graphical user interface (GUI) comprising a plurality of GUI items, the method comprising displaying the plurality of GUI items which a user is able to select on a screen; and moving GUI items displayed with a depth different from a GUI item selected by the user among the plurality of displayed GUI items to a predetermined area of the screen while changing the transparency of the GUI items with the depth different from the selected GUI item.

The moving may comprise moving GUI items displayed with a depth higher than the selected GUI item to the predetermined area of the screen while increasing the transparency of the GUI items with the depth higher than the selected GUI item.

The method may further comprise enlarging and displaying the selected GUI item on an area of the screen formed by the moving operation.

According to another aspect of the present invention, there is provided a method for providing a graphical user interface (GUI), the method comprising a first operation for moving GUI items displayed with a depth higher than a GUI item selected by a user, to a first area of a screen; a second operation for moving GUI items displayed with a depth lower than the selected GUI item, to a second area of the screen; and enlarging and displaying the selected GUI item on a third area of the screen formed by the first and second operations.

As described above, according to aspects of the present invention, the non-selected GUI items may be moved to a predetermined area of the screen, and the selected GUI item may be enlarged and displayed on an area formed by movement of the non-selected GUI items.

Therefore, it is possible to provide a GUI which enables easy manipulation and which is displayed with superior visual effect on a screen that is relatively small in size.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS

Certain exemplary embodiments of the present invention will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in excessive detail since they would obscure the invention unnecessarily.

Figure 1:
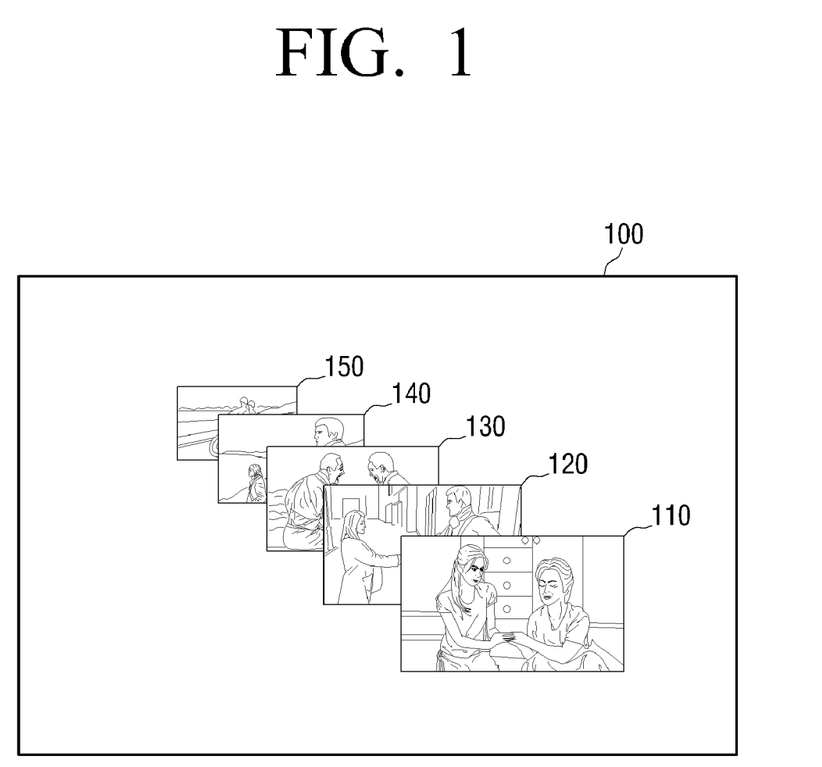
FIG. 1 is a view illustrating an example of a graphical user interface (GUI) displayed on a touch liquid crystal display (LCD) screen according to an exemplary embodiment of the present invention.

FIGS. 1 to 5 are views provided to explain a concept of a graphical user interface (GUI) to which the present invention may be applicable. FIG. 1 exemplarily illustrates a GUI displayed on a touch liquid crystal display (LCD) screen 100.

A GUI typically comprises a plurality of GUI items, for example, menus, icons, folders or contents, such as moving images, still images, music or text.

The GUI shown in FIG. 1 comprises a first GUI item 110 to fifth GUI item 150. The first to fifth GUI items 110 to 150 may be moving images, but moving images are merely examples. Accordingly, the present invention is also applicable to GUI items other than moving images.

A user may select a desired GUI item from among the plurality of GUI items of the GUI. When the GUI is displayed on the touch LCD screen 100 in an exemplary embodiment of the present invention, the user may touch the touch LCD screen 100 with his or her fingertips to select a desired GUI item.

FIGS. 2 to 5 exemplarily illustrate processes of changing the display state of the GUI on the touch LCD screen 100 when a user touches the third GUI item 130.

Figure 2:
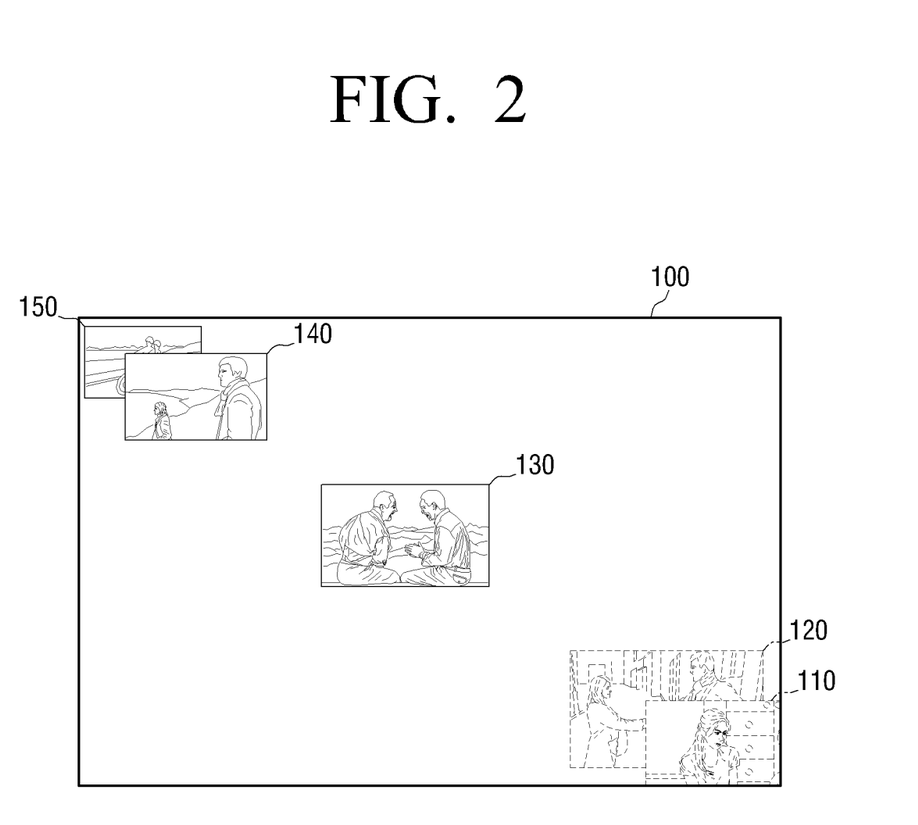
FIG. 2 is a view illustrating a process of changing the display state of non-selected GUI items according to an exemplary embodiment of the present invention.

If the user touches the third GUI item 130 with his or her fingertips, the first GUI item 110 and second GUI item 120 may move to a lower right corner of the screen 100 and the fourth GUI item 140 and fifth GUI item 150 may move to an upper left corner of the screen 100, as shown in FIG. 2.

Accordingly, the first GUI item 110 and second GUI item 120 are placed near the lower right corner of the screen 100, and the fourth GUI item 140 and fifth GUI item 150 are placed near the upper left corner of the screen 100.

In this situation, the first GUI item 110 and second GUI item 120 moving to the lower right corner of the screen 100 have a (visual) depth higher than the third GUI item 130 selected by the user. Herein, 'GUI items with a depth higher than the third GUI item 130' may appear to be above the third GUI item 130.

Additionally, the fourth GUI item 140 and fifth GUI item 150 moving to the upper left corner of the screen 100 have a depth lower than the third GUI item 130 selected by the user. Herein, 'GUI items with a depth lower than the third GUI item 130' may appear to be below the third GUI item 130.

As shown in FIG. 1, the first to fifth GUI items 110 to 150 are arranged diagonally from the upper left corner to the lower right corner of the screen 100.

Additionally, the first GUI item 110, second GUI item 120, fourth GUI item 140 and fifth GUI item 150 move diagonally, as shown in FIG. 2. In more detail, the first and second GUI items 110 and 120 move from the upper left corner to the lower right corner on the screen 100, but the fourth and fifth GUI items 140 and 150 move from the lower right corner to the upper left corner on the screen 100.

Referring to FIG. 2, the transparency of the first and second GUI items 110 and 120 moving to the lower right corner of the screen 100 (namely, the GUI items with a depth higher than the third GUI item 130 selected by the user) is increased, so the first and second GUI items 110 and 120 are displayed semitransparently.

A portion of the first GUI item 110 which has the highest depth and moves to the lowest rightmost corner of the screen 100 may be not displayed on the screen 100. Accordingly, the user may be provided with a visual effect showing that the first GUI item 110 partially disappears from the screen 100.

The process of changing the display state of GUI items other than the third GUI item 130 selected by the user on the screen 100 has been described above in detail with reference to FIG. 2.

Hereinafter, a process of changing the display state of the third GUI item 130 selected by the user on the screen 100 is now described in detail with reference to FIGS. 3 to 5.

Figure 3:
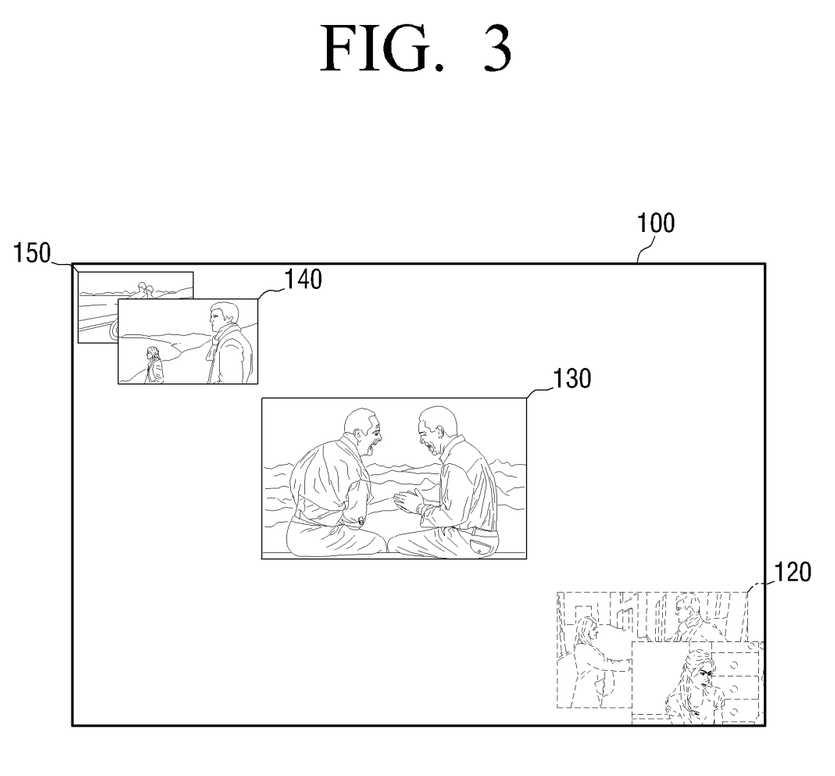
FIG. 3 is a view illustrating a process of changing the display state of a GUI item selected by a user according to an exemplary embodiment of the present invention.

In FIG. 3, the third GUI item 130 selected by the user is enlarged and displayed on the screen 100. In this situation, the third GUI item 130 is enlarged and displayed on an area of the screen 100 which has been formed by movement of the first GUI item 110, second GUI item 120, fourth GUI item 140 and fifth GUI item 150.

Although the size of the third GUI item 130 becomes larger than other GUI items, the third GUI item 130 may not cover the other GUI items on the screen 100, so that a user may view all of the GUI items displayed on the screen 100. However, the third GUI item 130 may be enlarged to cover at least one of the first GUI item 110, second GUI item 120, fourth GUI item 140 and fifth GUI item 150, if necessary. For example, the third GUI item 130 may be enlarged to partially cover the second and fourth GUI items 120 and 140.

Figure 4:
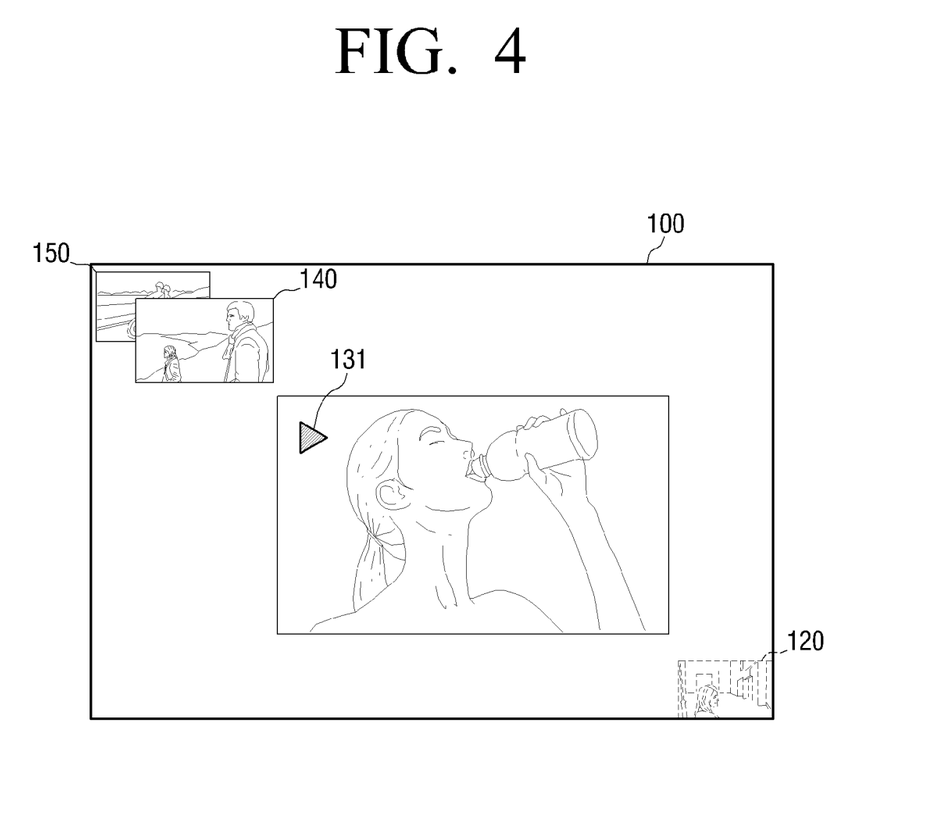
FIGS. 4 and 5 are views illustrating examples of a window displayed when the selected GUI item is activated according to exemplary embodiments of the present invention.

The third GUI item 130 selected by the user may be played back, as shown in FIG. 4. In FIG. 4, the third GUI item 130 disappears from the screen 100, and instead a media player window and a playback indication ▶ 131 are displayed.

To display the media player window larger than the third GUI item 130, the first GUI item 110 and a portion of the second GUI item 120 may disappear from the screen 100 while moving to the lower right corner of the screen 100.

If the third GUI item 130 is contents other than the moving image (for example, a still image, music or text) or an icon, the third GUI item 130 may disappear from the screen 100 and instead a program execution window for activating the contents or icon may be displayed on the screen 100.

Alternatively, if the third GUI item 130 is a menu or folder, a window showing sub-menus of the menu, or files of the folder may be displayed on the screen 100 after the third GUI item 130 disappears.

Figure 5:
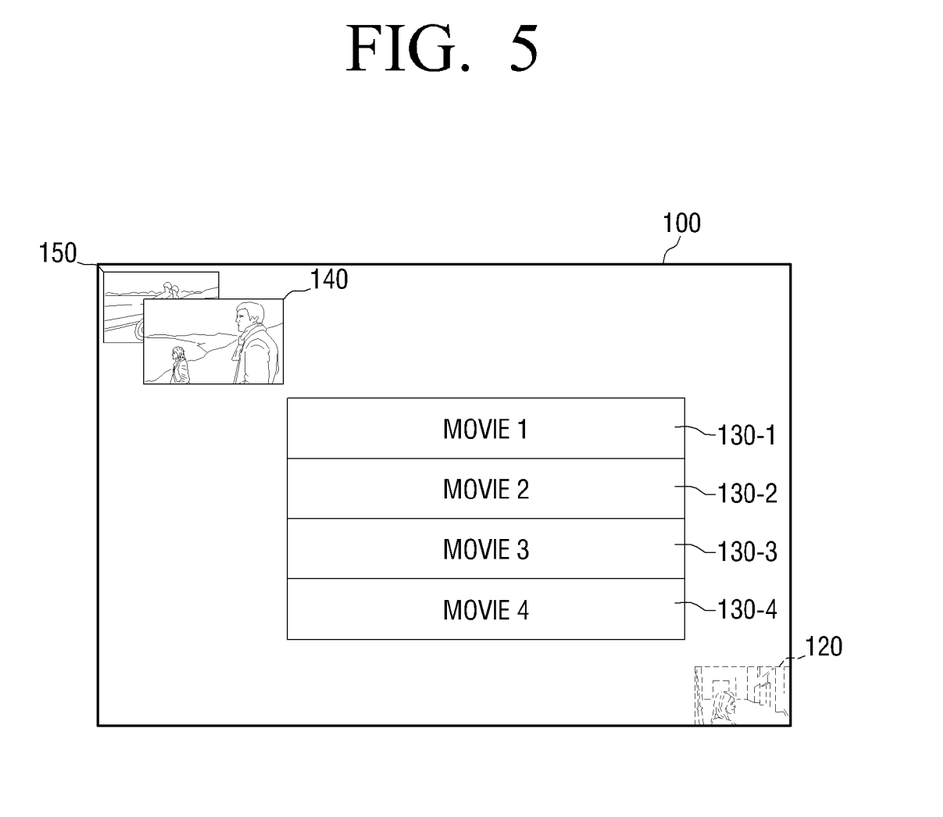

As shown in FIG. 5, when the third GUI item 130 is a moving image folder, a window showing a plurality of moving image files 130-1 to 130-4 contained in the moving image folder may be displayed on the screen 100 after the third GUI item 130 disappears.

The process of moving the non-selected GUI items to the corners of the screen to create space in the center of the screen, enlarging and displaying the selected GUI item on the center of the screen, and displaying a result of activating the selected GUI item or displaying sub-menus or files contained in the selected GUI item has been described above in detail in accordance with exemplary embodiments of the present invention.

Only the positions of non-selected GUI items are changed without any change in the size or the area overlapping between the non-selected GUI items in the exemplary embodiment of the present invention, but this is merely an example for convenience of description.

Figure 6:
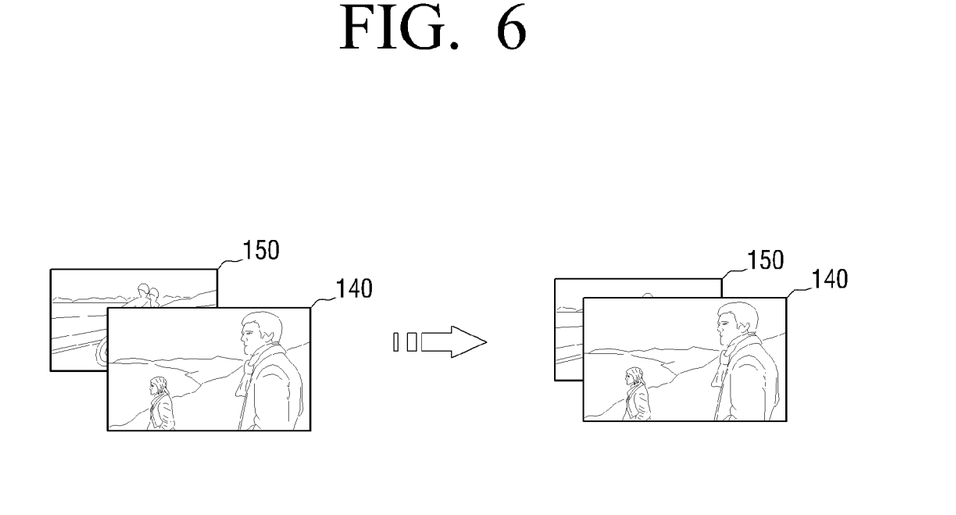
FIGS. 6 and 7 are views illustrating other processes of changing the display state of non-selected GUI items according to exemplary embodiments of the present invention.

As shown in FIG. 6, the fourth and fifth GUI items 140 and 150 which are not selected by the user may move to the upper left corner of the screen 100 so that an overlapping area between the fourth and fifth GUI items 140 and 150 may become larger. Similarly, the first and second GUI items 110 and 120 which are not selected by the user may move to the lower right corner of the screen 100 so that an overlapping area between the first and second GUI items 110 and 120 may become larger.

Figure 7:
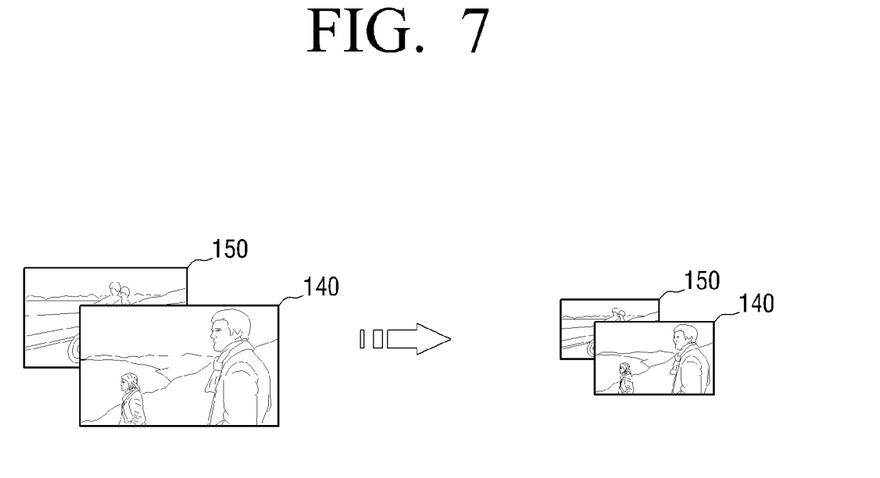

As shown in FIG. 7, the fourth and fifth GUI items 140 and 150 which are not selected by the user may move to the upper left corner of the screen 100 so that the size of the fourth and fifth GUI items 140 and 150 may become smaller. Similarly, the first and second GUI items 110 and 120 which are not selected by the user may move to the lower right corner of the screen 100 so that the size of the first and second GUI items 110 and 120 may become smaller.

However, these non-selected GUI items may move to the corners of the screen 100 so that the size of the non-selected GUI items may become larger, if necessary.

Figure 8:
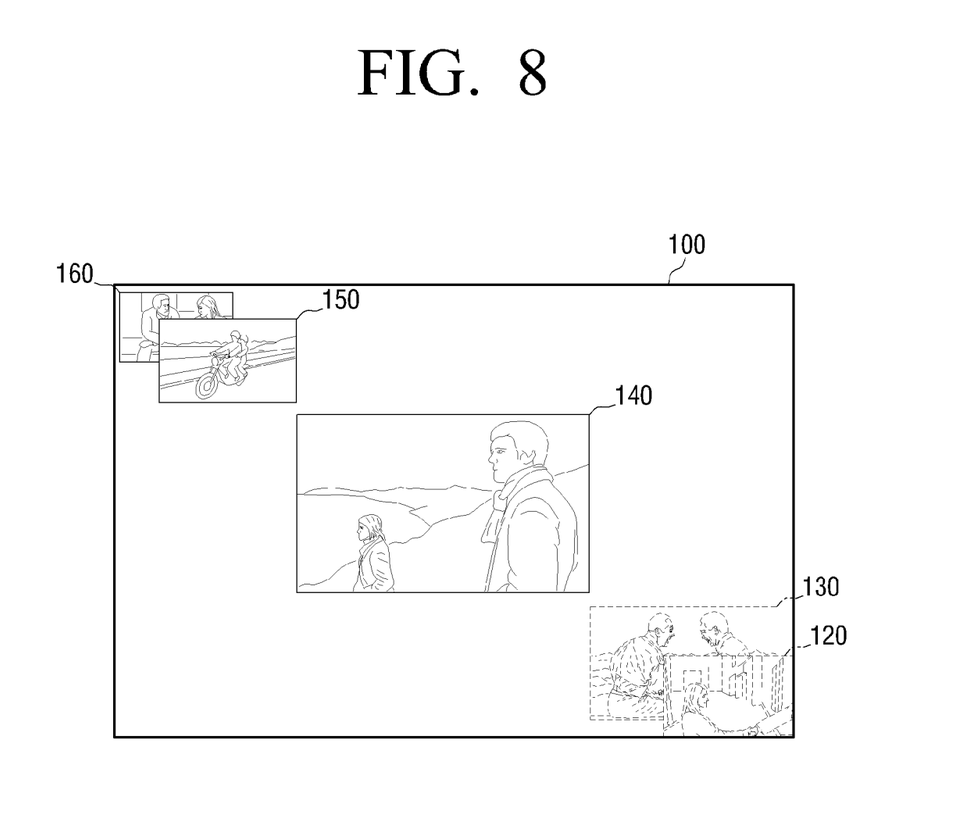
FIGS. 8 and 9 are views illustrating other processes of changing the display state of a GUI item selected by a user according to exemplary embodiments of the present invention.

When the GUI shown in FIG. 1 is currently displayed, if the user selects the forth GUI item 140, the GUI items may be displayed as shown in FIG. 8.

In FIG. 8, the first GUI item 110 moves to the lower right corner of the screen 100 so as to disappear from the screen 100, and the second and third GUI items 120 and 130 move to the lower right corner of the screen 100.

Additionally, the fifth GUI item 150 moves to the upper left corner of the screen 100, and a sixth GUI item 160 is newly displayed on the screen 100.

Furthermore, the fourth GUI item 140 selected by the user moves to the center of the screen 100 so that the size of the fourth GUI item 140 becomes larger than the non-selected GUI items.

Figure 9:
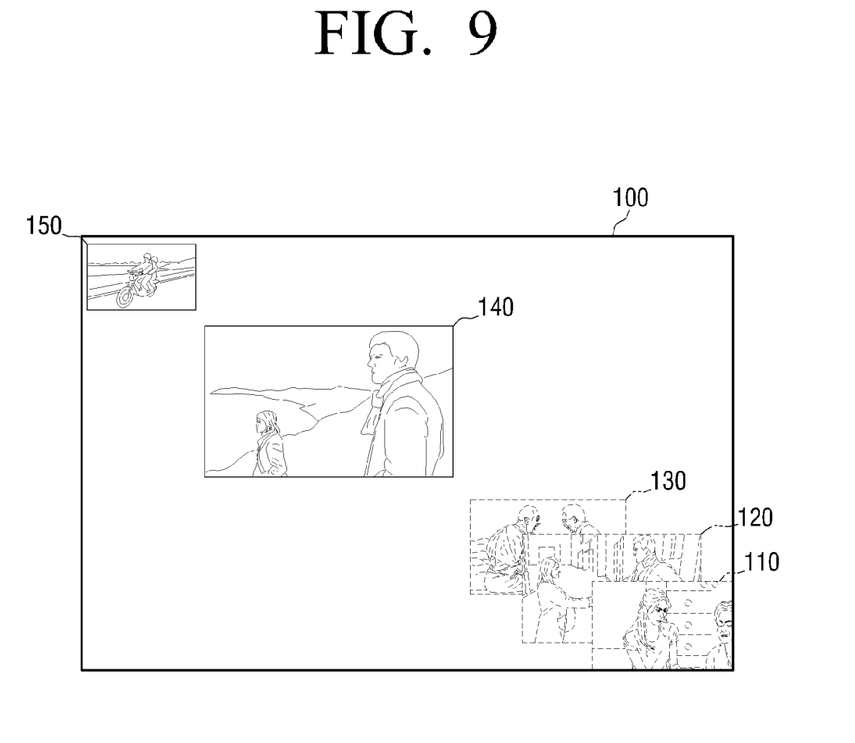

Alternatively, if the user selects the forth GUI item 140 when the GUI shown in FIG. 1 is currently displayed, the GUI items may be displayed as shown in FIG. 9.

In FIG. 9, the first, second and third GUI items 110 to 130 move to the lower right corner of the screen 100, and the fifth GUI item 150 moves to the upper left corner of the screen 100.

There is no change in the GUI items appearing on the screen 100 as shown in FIG. 9, whereas some of the GUI items disappear from the screen 100 and the new GUI item appears on the screen 100 as shown in FIG. 8. Accordingly, the GUI of FIG. 9 differs from the GUI of FIG. 8.

Additionally, in FIG. 9, the forth GUI item 140 selected by the user is enlarged and displayed on an area of the screen 100 which is formed by movement of the first GUI item 110, second GUI item 120, third GUI item 130 and fifth GUI item 150.

While the first to fifth GUI items 110 to 150 of the GUI shown in FIG. 1 overlap partially, this is merely an example for convenience of description.

Figure 10:
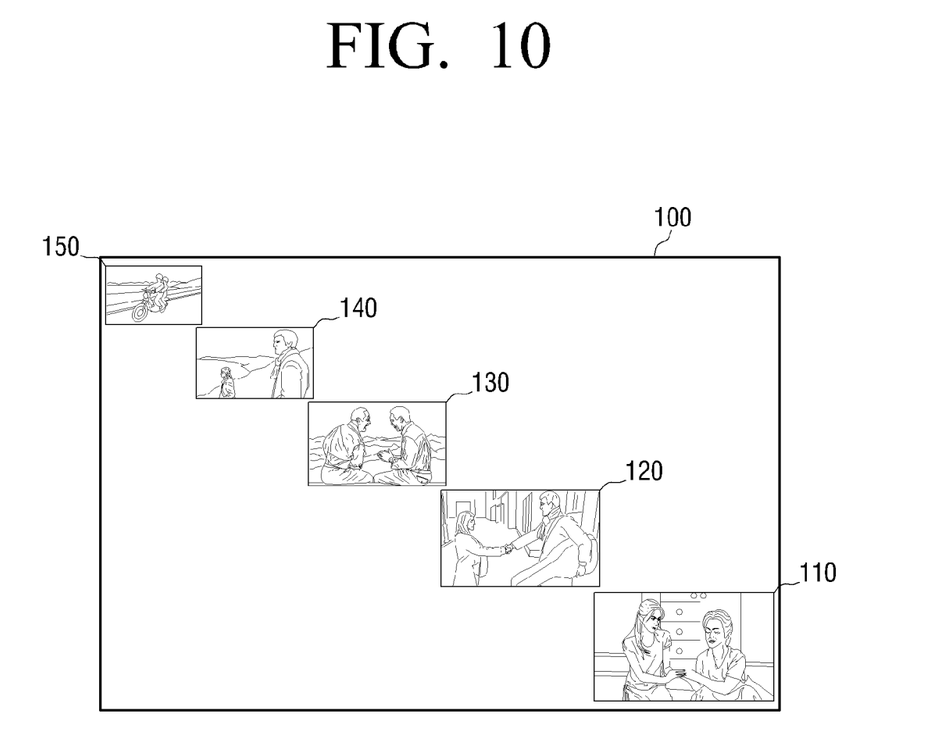
FIG. 10 is a view illustrating another example of a GUI displayed on the touch LCD screen according to an exemplary embodiment of the present invention.

Accordingly, the first to fifth GUI items 110 to 150 may be displayed so as not to overlap one another, as shown in FIG. 10. However, the GUI shown in FIG. 10 is also merely an example, and thus the present invention may be also applicable to a GUI comprising a plurality of GUI items of which the number, the arrangement, the size or the shape differ from the GUI items of the GUI shown in FIG. 10.

If the user selects the third GUI item 130 from among the first to fifth GUI items 110 to 150 of the GUI shown in FIG. 10, the first to fifth GUI items 110 to 150 may be displayed as shown in FIG. 3.

In this situation, the first and second GUI items 110 and 120 partially overlap while moving to the lower right corner of the screen 100, and the fourth and fifth GUI items 140 and 150 also partially overlap while moving to the upper left corner of the screen 100.

According to an exemplary embodiment of the present invention described above, the GUI items with a depth higher than the selected GUI item move to the lower right corner of the screen 100, and the GUI items with a depth lower than the selected GUI item move to the upper left corner of the screen 100.

In more detail, the GUI items with a depth higher than the selected GUI item move to an area containing the lower right corner of the screen 100, and the GUI items with a depth lower than the selected GUI item move to an area containing the upper left corner of the screen 100, but this is merely an example for convenience of description. Accordingly, the GUI items may move to areas of the screen 100 other than the area containing the upper left corner and area containing the lower right corner, for example, an area containing an upper right corner of the screen 100 or an area containing a lower left corner of the screen 100.

The GUI item selected by the user may desirably be enlarged and displayed on areas other than the areas containing the corners of the screen 100, but may be displayed on areas containing the corners of the screen 100 if necessary.

Additionally, the non-selected GUI items form one or more groups and each of the formed groups moves diagonally between the upper left corner and the lower right corner of the screen 100 in exemplary embodiments of the present invention. However, this is merely an example for convenience of description, and accordingly, the present invention is equally applicable to a situation in which each of the formed groups moves in any direction other than diagonally.

For example, the non-selected GUI items may form one or more groups and each of the formed groups may move to the upper right corner of the screen 100 or the lower right corner of the screen 100. In this situation, the GUI item selected by the user may be enlarged on the left side of the screen 100.

While the direction in which the non-selected GUI items move has been determined according to the depth level, this is also an example for convenience of description. Accordingly, the present invention is also applicable to a situation in which GUI items placed near the upper left corner of the screen 100 move to the upper left corner, and GUI items placed near the lower right corner of the screen 100 move to the lower right corner.

Furthermore, only the GUI items with the depth higher than the selected GUI item have been shown to become transparent in exemplary embodiments of the present invention, but this is merely an example for convenience of description. Accordingly, the present invention is also applicable to a situation in which the transparency of the GUI items with the depth higher than the selected GUI item is reduced. Additionally, the transparency of the GUI items with the depth lower than the selected GUI item may be changed.

Figure 11:
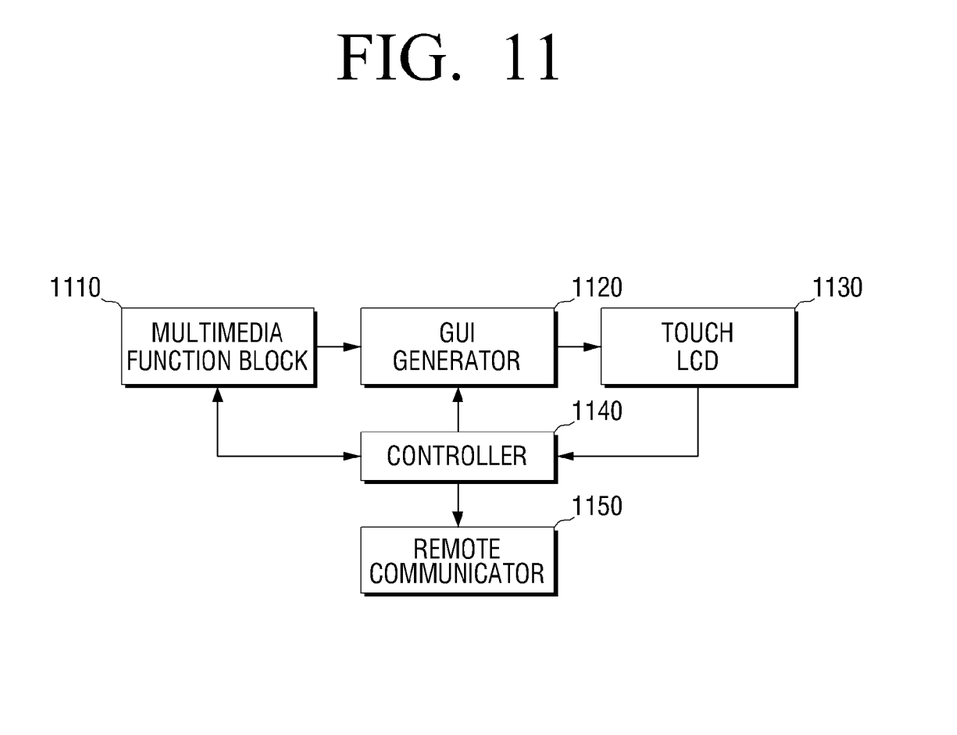
FIG. 11 is a block diagram of an electronic device to which the present invention may be applicable.

FIG. 11 is a block diagram of an electronic device capable of providing the GUI that has been described above. In FIG. 11, the electronic device comprises a multimedia function block 1110, a GUI generator 1120, a touch LCD 1130, a controller 1140 and a remote communicator 1150.

The multimedia function block 1110 performs various functions provided by the electronic device, for example playback of contents such as a moving image, a still image, music or text, recording, document preparation, gaming or other functions.

The GUI generator 120 generates a GUI under the control of the controller 1140, and adds the generated GUI to an image output from the multimedia function block 1110.

The touch LCD 1130 displays the image to which the GUI output from the GUI generator 1120 is added. Additionally, the touch LCD 1130 may be used to receive user operations by touching or dragging.

The controller 1140 controls the operation of the multimedia function block 1110 according to the user operations received through the touch LCD 1130 or other possible manipulating means such as a button (not shown).

The remote communicator 1150 is capable of performing remote communication with other home devices (for example, a television (TV) or a digital versatile disk (DVD) player). In this situation, the remote communication may be performed via infrared rays or radio frequency (RF).

If a user enters a command to remotely control a desired home device (for example, a TV or a DVD player) using the touch LCD 1130 or other possible manipulating means, the controller 1140 sends the command to the desired home device through the remote communicator 1150.

Additionally, the controller 1140 controls the GUI generator 1120 so that a GUI provided in response to the user operation is displayed on the touch LCD 1130. Hereinafter, a method for providing a GUI is now described in detail with reference to FIG. 12.

Figure 12:
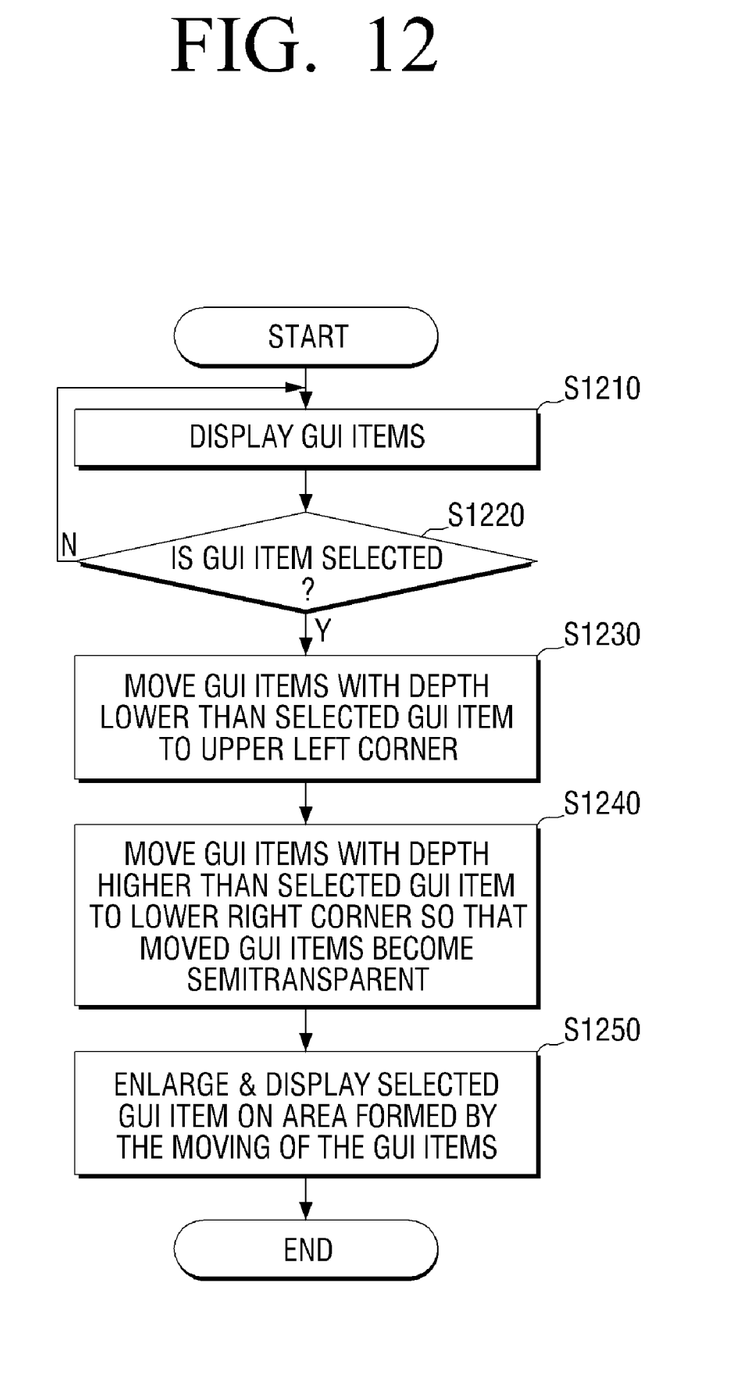
FIG. 12 is a flowchart explaining a method for providing a GUI according to an exemplary embodiment of the present invention.

In FIG. 12, the controller 1140 controls the GUI generator 1120 so that a GUI showing a plurality of GUI items which a user may select is displayed on the touch LCD 1130 (S1210).

After operation S1210, the GUI of FIG. 1 or the GUI of FIG. 10 may be displayed on the touch LCD 1130.

Subsequently, if the user selects a desired GUI item from among the plurality of GUI items (S1220-Y), the controller 1140 controls the GUI generator 1120 so that GUI items with a depth lower than the selected GUI item move to an upper left corner of the touch LCD 1130 (S1230).

Additionally, the controller 1140 controls the GUI generator 1120 so that GUI items with a depth higher than the selected GUI item move to a lower right corner of the touch LCD 1130 and become transparent or semitransparent (S1240).

The controller 1140 also controls the GUI generator 1120 so that the selected GUI item is enlarged and displayed on an area formed by the moving of GUI items in operations S1230 and S1240 (S1250).

Operations S1230 to S1250 have been described above in detail with reference to FIGS. 2 and 3.

After operation S1250, the display state of the selected GUI item may be changed as shown in FIGS. 4 and 5. Additionally, operations S1230 and S1240 may be performed so that the GUI items may be displayed as shown in FIGS. 6 and 7. Moreover, operations S1230 to S1250 may be performed so that the display state of the GUI items may be changed as shown in FIGS. 8 and 9.

While the electronic device shown in FIG. 11 is capable of providing a multimedia content playback function and remotely controlling a home device such as a TV, this is merely an example.

Accordingly, the present invention is also applicable to any electronic device capable of performing functions other than the multimedia content playback function, for example a portable multimedia device which does not require the remote communicator 1150.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for providing a graphical user interface (GUI) comprising a plurality of GUI items, the method comprising:
   a first operation for moving GUI items in a first group among GUI items other than a GUI item selected by a user, to a first area of a screen;
   a second operation for moving GUI items in a second group among the GUI items other than the selected GUI item, to a second area of the screen; and
   enlarging and displaying the selected GUI item on a third area of the screen formed by moving the GUI items in the first group and the GUI items in the second group,
   wherein at least one of the first operation, the second operation, and the enlarging and displaying is performed using a processor.

2. The method as claimed in claim 1, wherein the GUI items in the first group are displayed with a visual depth higher than the selected GUI item, and
   the GUI items in the second group are displayed with a visual depth lower than the selected GUI item.

3. The method as claimed in claim 2, wherein the first operation comprises moving the GUI items in the first group to the first area while increasing a transparency of the GUI items in the first group.

4. The method as claimed in claim 2, wherein the first operation comprises moving the GUI items in the first group to the first area so that one of the GUI items in the first group partially disappears from the screen.

5. The method as claimed in claim 1, further comprising:
   displaying either 1) a plurality of sub-items contained in the selected GUI item or 2) a window formed as a result of activating the selected GUI item, after the selected GUI item disappears from the screen.

6. The method as claimed in claim 1, wherein the first area is an area containing a first corner of the screen,
   the second area is an area containing a second corner of the screen,
   the first operation comprises moving the GUI items in the first group to the first corner, and
   the second operation comprises moving the GUI items in the second group to the second corner.

7. The method as claimed in claim 1, wherein the first area is an area containing a first corner of the screen,
   the second area is an area containing a second corner of the screen,
   the first corner and the second corner are symmetrical about a center of the screen,
   the first operation comprises moving the GUI items in the first group from the second corner to the first corner, and
   the second operation comprises moving the GUI items in the second group from the first corner to the second corner.

8. The method as claimed in claim 1, wherein the first operation comprises moving the GUI items in the first group to the first area while increasing or reducing a size of the GUI items in the first group, and
   the second operation comprises moving the GUI items in the second group to the second area while increasing or reducing a size of the GUI items in the second group.

9. The method as claimed in claim 1, wherein the first area is an area containing a first corner of the screen,
   the second area is an area containing a second corner of the screen,
   the GUI items in the first group are placed closer to the first corner than the second corner, and
   the GUI items in the second group are placed closer to the second corner than the first corner.

10. The method as claimed in claim 1, wherein the first area is an area containing a first corner of the screen,
    the second area is an area containing a second corner of the screen, and
    the third area is an area other than the first corner and second corner.

11. The method as claimed in claim 10, wherein the first corner and the second corner are symmetrical about a center of the screen.

12. The method as claimed in claim 1, wherein overlapping areas between the GUI items in the first group are increased in size while the GUI items in the first group are moved to the first area, and
    overlapping areas between the GUI items in the second group are increased in size while the GUI items in the second group are moved to the second area.

13. The method as claimed in claim 1, wherein the GUI items in the first group overlap one another while moving to the first area, and
    the GUI items in the second group overlap one another while moving to the second area.

14. The method as claimed in claim 1, wherein the enlarging and displaying comprises enlarging the selected GUI item while moving the selected GUI item.

15. The method as claimed in claim 1, wherein the plurality of GUI items comprise a menu, an icon, a folder and contents, and
    the contents comprise a moving image, a still image, music and text.

16. An electronic device comprising:
    a graphical user interface (GUI) generator which generates a GUI comprising a plurality of GUI items which a user is able to select; and
    a controller which controls the GUI generator, so that GUI items in a first group among GUI items other than a GUI item selected by the user move to a first area of a screen, GUI items in a second group among the GUI items other than the selected GUI item move to a second area of the screen, and the selected GUI item is enlarged and displayed on a third area of the screen formed by movement of the GUI items in the first group and GUI items in the second group.

17. The electronic device as claimed in claim 16, wherein the GUI items in the first group are displayed with a visual depth higher than the selected GUI item, and
the GUI items in the second group are displayed with a visual depth lower than the selected GUI item.

18. The electronic device as claimed in claim 17, wherein the controller controls the GUI generator so that the GUI items in the first group move to the first area while a transparency of the GUI items in the first group is increased.

19. A method for providing a graphical user interface (GUI) comprising a plurality of GUI items, the method comprising:
displaying the plurality of GUI items which a user is able to select on a screen; and
moving GUI items displayed with a visual depth different from a GUI item selected by the user among the plurality of displayed GUI items to a selected area of the screen while changing a transparency of the GUI items with the depth different from the selected GUI item,
wherein at least one of the displaying and the moving is performed using a processor.

20. The method as claimed in claim 19, wherein the moving comprises moving GUI items displayed with a visual depth higher than the selected GUI item to the selected area of the screen while increasing the transparency of the GUI items with the visual depth higher than the selected GUI item.

21. The method as claimed in claim 19, further comprising:
enlarging and displaying the selected GUI item on an area of the screen formed by moving the GUI items displayed with the visual depth different from the selected GUI item.

22. A method for providing a graphical user interface (GUI), the method comprising:
a first operation for moving GUI items displayed with a visual depth higher than a GUI item selected by a user, to a first area of a screen;
a second operation for moving GUI items displayed with a visual depth lower than the selected GUI item, to a second area of the screen; and
enlarging and displaying the selected GUI item on a third area of the screen formed by moving the GUI items displayed with the visual depth higher than the selected GUI item and the GUI items displayed with the visual depth lower than the selected GUI item,
wherein at least one of the first operation, the second operation, and the enlarging and displaying is performed using a processor.

23. A method of displaying a plurality of graphical user interface (GUI) items in a GUI on a screen, the method comprising:
displaying the GUI items in the GUI;
selecting one of the displayed GUI items;
moving the displayed GUI items other than the selected one of the displayed GUI items towards at least one corner of the screen; and
enlarging and displaying the selected one of the displayed GUI items on an area of the screen vacated by the moving of the displayed GUI items other than the selected one of the displayed GUI items,
wherein at least one of the displaying, the selecting, and the moving is performed using a processor.

24. The method as claimed in claim 23, wherein the moving comprises moving a first group of the displayed GUI items, other than the selected one of the displayed GUI items, to a first corner of the screen, and moving a second group of the displayed GUI items, other than the displayed GUI items of the first group and the selected one of the displayed GUI items, to a second corner of the screen.

* * * * *